Dec. 23, 1941. E. S. MIX 2,267,038
PLASTICIZED METAL CHAIN
Filed Nov. 20, 1940

Inventor
Edwin S. Mix.
By
Attorney

Patented Dec. 23, 1941

2,267,038

UNITED STATES PATENT OFFICE 2,267,038

PLASTICIZED METAL CHAIN

Edwin S. Mix, Rochester, N. Y., assignor to Hickok Manufacturing Company, Inc., Rochester, N. Y., a corporation of New York Application November 20, 1940, Serial No. 366,469

3 Claims. (Cl. 59—79)

The invention relates to plasticized metal chains.

The object of the present invention is to coat or cover a chain of metal or other suitable material with a thermoplastic material adapted during the application of the material to the chain to cause the chain to contract in a longitudinal direction and the material to fill in spaces between the links of the chain and to impart to the chain elasticity in a longitudinal direction so that the chain will stretch and not break should it be subjected to a sudden pull which might otherwise injure a metal chain.

A further object of the invention is to provide a plasticized metal chain of this character of a highly ornamental and attractive appearance adapted to be finished in gold, silver or colors, or a combination of gold and silver and colors so as to produce in chains for personal wear highly pleasing and desirable effects.

It is also an object of the invention to enable a metal chain to be easily and quickly covered with a thermoplastic material having characteristics of transparency and adapted also to be extended beyond the ends of the chain and molded into solid terminal portions for the attachment of connecting links so that end elements, key rings, clips and the like may be readily applied to the covered metallic chain for completing the same.

A further object of the invention is to enable the thermoplastic material to be applied to a metal chain either by a dipping process or an extrusion process and also to enable the amount of stretch or elasticity to be controlled.

With these and other objects in view, the invention consists in the construction and novel combination and arrangement of parts hereinafter fully described, illustrated in the accompanying drawing and pointed out in the claims hereto appended, it being understood that various changes in the form, proportion, and minor details of construction as well as in the steps of the method may be resorted to without departing from the spirit or sacrificing any advantages of the invention.

Figure 1:
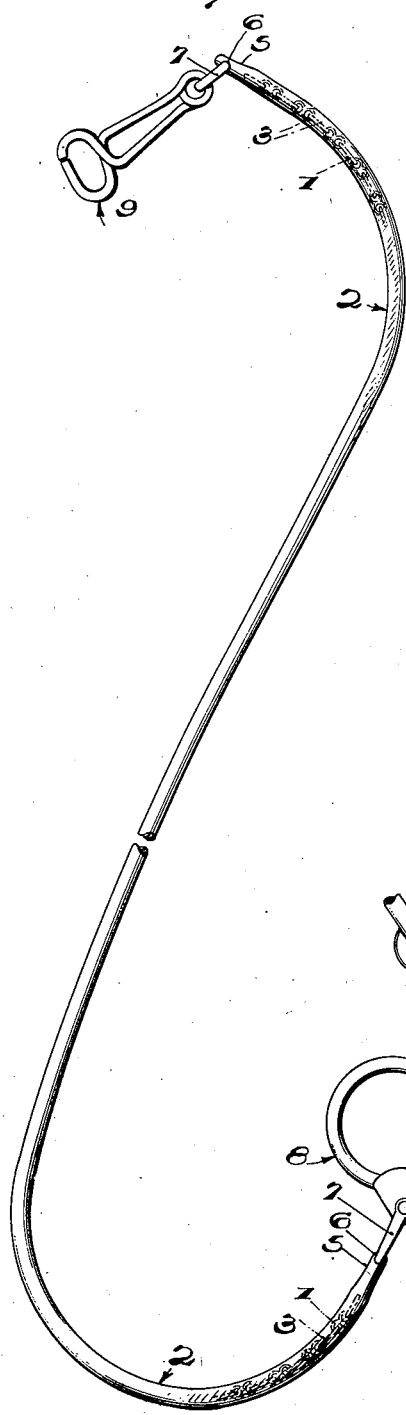
Figure 1 is a plan view of a plasticized metal chain constructed in accordance with this invention.
Figure 2:
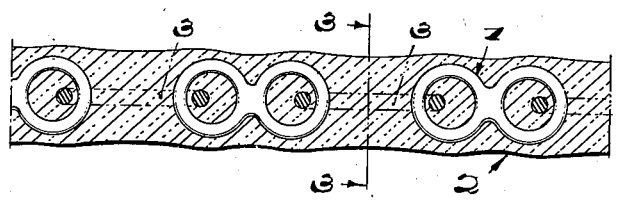
Figure 2 is an enlarged longitudinal sectional view of a portion of the chain.
Figure 3:
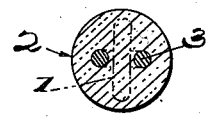
Figure 3 is a transverse sectional view of the same.
Figure 4:
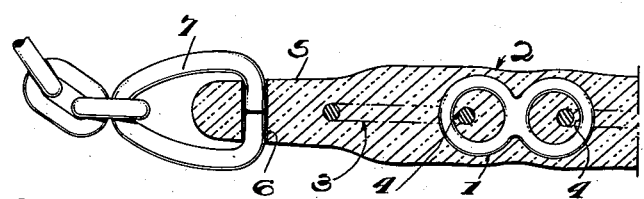
Figure 4 is an enlarged longitudinal sectional view through one of the terminal extensions illustrating one means for securing a connecting link to such extension.

In the accompanying drawing in which is illustrated one form of the invention, 1 designates a metal chain composed of links of any desired character or form but material other than metal may of course be employed in the construction of the chain. The chain is of uniform diameter to enable it to be readily coated or covered with thermoplastic material 2 by a dipping method or extrusion method. The thermoplastic material may be Vinylite or other material having the characteristics of Vinylite and may be used in granular form and applied to the chain by an extrusion process or it can be in the form of a solution which after dipping will solidify by evaporation of the solvents or diluents. The thermoplastic material can be liquefied either by heat or solvents or diluents.

It has been found at the present time that the simplest and quickest method of applying thermoplastic material to the chain is by the dipping process by running the chain through the liquid plastic and drawing it out at a sufficiently slow rate of speed as to enable it to accumulate the desired amount of material without excess accumulation and at the same time eliminate sag. The plastic material may be allowed to dry either at room temperature or forced draft or heat and by applying successive coats the material may be built up to the required thickness of the coating both for protection and mechanical characteristics.

The thermoplastic material may also be applied to the chain by an extrusion method and this is done in a machine through which the chain is drawn and the plastic material applied around the chain, both being forced through a nozzle or aperture of a predetermined diameter and then allowed to cool. Any suitable machine of the character generally known to the trade as a stuffer may be employed and is similar to machines used in wire covering or stuffing sausages.

The plasticized metal chain has a certain amount of stretch or elasticity in a longitudinal direction which may be varied and which depends upon the process used. If the chain is dipped in the plastic solution a certain amount of shrinkage takes place which draws the links together and fills in spaces 4 between the links 3 as well as the openings defined by the links. If the chain is covered by the extrusion process, the amount of tension on the chain, plus the pressure of material at the nozzle of the extruder will determine the amount of stretch or extension. The elasticity or stretch imparted to the chain will be found advantageous as the chain, should it be subjected to a sudden pull or jerk, will stretch and will not be subjected to the injury or damage which would occur with an ordinary metal chain under such conditions.

The chains may be finished in gold, or silver, or colors, or a combination of gold, silver and colors to produce the desired effects. A color can be applied either directly to the chain by metallic plating processes, or it can be applied in the solution, which produces an entirely different series of effects.

It will be noted that various sizes of chains can be used in order to produce different effects and if smaller and weaker types of chains are desired it is simply a matter of applying a sufficient amount of plastic material in order to insure the final tensile strength desired. Also by varying the types of links in the chain and their lengths and the construction of the links affords another series of variations in the ornamental characteristics of the chains.

After the desired amount of plastic material by successive applications of the same has been built up on the chain a sufficient amount of the plastic material is used to form terminal extensions 5 preferably molded in solid form and provided with transverse openings 6 for the reception of connecting links 7 for the attachment of end elements. The end elements may be in the form of a ring 8 for the reception of keys and clasp 9 for engaging one of the belt loops of trousers. Any suitable end elements may be employed for adapting the chain for the particular personal use for which it is intended.

The terminal extensions which form means for attaching the connecting links enable chains of substantially uniform diameter to be used in the different methods of applying the coating or covering of thermoplastic material to them as they do not have any end elements which would interfere with either the extrusion process or a dipping process where chains are drawn through liquid plastic material. The molded terminal extensions 5 possess sufficient mechanical strength to be entirely satisfactory in various chains for personal wear.

What is claimed is:

1. A plasticized chain comprising a metal chain composed of links and normally in a lengthwise contracted condition, an elastic plastic material covering the chain and filling spaces between the links and normally maintaining the chain in such contracted condition, said material imparting elasticity to the chain in a lengthwise direction, and terminal extensions located beyond the ends of the chain and formed of said plastic material for the attachment of end elements.

2. A plasticized chain comprising a metal chain composed of links and normally in a lengthwise contracted condition, an elastic plastic material covering the chain and filling spaces between the links and normally maintaining the chain in such contracted condition, said material imparting elasticity to the chain in a lengthwise direction, terminal extensions located beyond the ends of the chain and formed of said plastic material and provided with transverse openings, connecting links secured in the transverse openings of said extensions, and end elements connected with said connecting links.

3. A plasticized metal chain comprising a chain composed of links arranged in a lengthwise contracted condition and a thermoplastic elastic material covering the chain and filling spaces between the links thereof and openings defined by the links and imparting elasticity to the chain in a lengthwise direction, terminal extensions formed of said plastic material and located beyond the ends of the chain, connecting links secured to said terminal extensions, and end elements connected with said connecting links.

EDWIN S. MIX.